US012565864B2

(12) United States Patent
Ives et al.

(10) Patent No.: US 12,565,864 B2
(45) Date of Patent: Mar. 3, 2026

(54) OXYGEN SENSOR HEATER CONTROL FOR HYBRID VEHICLE

(71) Applicant: FCA US LLC, Auburn Hills, MI (US)

(72) Inventors: Mark E Ives, LaSalle (CA); Kevin L Mason, Farmington Hills, MI (US); Andreas Q Quainoo, Superior Township, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/526,082

(22) Filed: Dec. 1, 2023

(65) Prior Publication Data

US 2025/0179968 A1 Jun. 5, 2025

(51) Int. Cl.
*F02D 41/14* (2006.01)
*F01N 11/00* (2006.01)
*F01N 13/00* (2010.01)
*F02D 41/30* (2006.01)

(52) U.S. Cl.
CPC ........ *F02D 41/1454* (2013.01); *F01N 11/007* (2013.01); *F01N 13/0093* (2014.06); *F02D 41/3076* (2013.01); *F01N 2550/02* (2013.01)

(58) Field of Classification Search
CPC ............. F02D 41/1454; F02D 41/3076; F01N 11/007; F01N 13/0093; F01N 2550/02
See application file for complete search history.

(56) References Cited

U.S. PATENT DOCUMENTS

| | | | | |
|---|---|---|---|---|
| 11,313,303 | B1 * | 4/2022 | Goodwin | F02D 41/1455 |
| 2004/0007403 | A1 * | 1/2004 | Tomatsuri | B60K 6/445 180/65.235 |
| 2004/0045753 | A1 * | 3/2004 | Yamaguchi | B60L 15/2072 180/65.28 |
| 2004/0163380 | A1 * | 8/2004 | Yasui | F02D 41/1455 60/285 |
| 2010/0132680 | A1 * | 6/2010 | Iwahashi | F02D 41/1494 123/697 |
| 2011/0224851 | A1 * | 9/2011 | Jacques | B60K 6/48 180/65.265 |
| 2012/0035818 | A1 * | 2/2012 | Takanami | B60W 30/1882 701/54 |
| 2018/0313243 | A1 * | 11/2018 | Tamura | G01N 27/04 |
| 2019/0145333 | A1 * | 5/2019 | Surnilla | F02D 41/1494 123/697 |
| 2019/0218991 | A1 * | 7/2019 | Ulrey | F02D 35/0015 |

* cited by examiner

*Primary Examiner* — Matthew T Largi
(74) *Attorney, Agent, or Firm* — Jeremy J. Klobucar

(57) ABSTRACT

A control system for a hybrid electric vehicle having an electric drive module and an internal combustion engine with an exhaust system. The control system includes one or more oxygen (O2) sensors disposed proximate to a catalytic converter in the exhaust system, the one or more O2 sensors each being configured to measure an O2 level of exhaust gas produced by the engine. A controller is in signal communication with the one or more O2 sensors and programmed to detect the hybrid electric vehicle is keyed on, determine the hybrid electric vehicle is keyed to run in an electric vehicle (EV) mode without the engine started, and initiate an O2 sensor heating mode to heat the one or more O2 sensors to a predetermined target temperature prior to the engine starting. The predetermined target temperature is operable for closed loop fueling feedback control, to thereby reduce exhaust emissions.

16 Claims, 3 Drawing Sheets

OXYGEN SENSOR HEATER CONTROL FOR HYBRID VEHICLE

FIELD

The present application relates generally to vehicle engine exhaust treatment systems and, more particularly, to oxygen sensor heating control for hybrid vehicles.

BACKGROUND

Catalysts are typically implemented in vehicle exhaust systems for treating exhaust gas produced by an internal combustion engine to mitigate or eliminate emissions. A majority of the cumulative tailpipe emissions measured on standard test cycles are attributed to a cold start, due to the inability of a cold three-way catalytic converter (TWC) to convert carbon monoxide (CO) and unburnt hydrocarbons (HC) to produce carbon dioxide ($CO_2$) and water ($H_2O$), as well as reduce nitrogen oxides ($NO_x$) to nitrogen ($N_2$). Known solutions to reduce emissions during cold start rely heavily on open loop fueling target and modifiers based on complex airflow models that require long calibration times. Additionally, a large dependency is placed on these airflow models to ensure that it accurately models the correct amount of air such that open loop control can accurately determine the amount of fuel to be delivered. However, this may lead to higher amounts of fueling as well as variation since there is no feedback control. Thus, while such conventional systems do work for their intended purpose, it is desirable to provide continuous improvement in the relevant art.

SUMMARY

In accordance with one example aspect of the invention, a control system for a hybrid electric vehicle having an electric drive module and an internal combustion engine with an exhaust system is provided. In one example implementation, the control system includes one or more oxygen (O2) sensors disposed proximate to a catalytic converter in the exhaust system, the one or more O2 sensors each being configured to measure an O2 level of exhaust gas produced by the engine. A controller is in signal communication with the one or more O2 sensors and programmed to detect the hybrid electric vehicle is keyed on, determine the hybrid electric vehicle is keyed to run in an electric vehicle (EV) mode without the engine started, and initiate an O2 sensor heating mode to heat the one or more O2 sensors to a predetermined target temperature prior to the engine starting. The predetermined target temperature is operable for closed loop fueling feedback control, to thereby reduce exhaust emissions.

In addition to the foregoing, the described control system may include one or more of the following features: wherein the controller is further programmed to monitor the one or more O2 sensors to determine they have reached the predetermined target temperature such that they are ready for closed loop fueling feedback control; wherein the controller monitors a resistance of the one or more O2 sensors to determine a temperature thereof; and wherein once the one or more O2 sensors have reached the predetermined target temperature and the engine is turned on, the controller is further programmed to initiate a closed loop feedback fuel control.

In addition to the foregoing, the described control system may include one or more of the following features: wherein the controller is programmed to initiate the closed loop feedback fuel control as soon as the engine is turned on, without performing an open loop fuel control; wherein the closed loop feedback fuel control includes a targeted fuel-air ratio; wherein the at least one O2 sensor includes a heating element configured to heat the at least one O2 sensor; wherein the at least one O2 sensor includes a first O2 sensor and a second O2 sensor; and wherein the catalytic converter includes a first catalyst disposed upstream of a second catalyst, and wherein the first O2 sensor is disposed upstream of the first catalyst, and the second O2 sensor is disposed downstream of the first catalyst and upstream of the second catalyst.

In accordance with another example aspect of the invention, a method of reducing exhaust emissions during a cold start of a hybrid electric vehicle having an electric drive module and an internal combustion engine with an exhaust system is provided. In one example implementation, the method includes providing a controller in signal communication with one or more oxygen (O2) sensors disposed proximate to a catalytic converter in the exhaust system, the one or more O2 sensors each being configured to measure an O2 level of exhaust gas produced by the engine; detecting, by the controller, the hybrid electric vehicle is keyed on; determining, by the controller, the hybrid electric vehicle is keyed on to run in an electric vehicle (EV) mode without the engine started; and initiating, by the controller, an O2 sensor heating mode to heat the one or more O2 sensors to a predetermined target temperature prior to the engine starting. The predetermined target temperature is operable for closed loop fueling feedback control, to thereby reduce exhaust emissions.

In addition to the foregoing, the described method may include one or more of the following features: monitoring the one or more O2 sensors to determine they have reached the predetermined target temperature such that they are ready for closed loop fueling feedback control; wherein the controller monitors a resistance of the one or more O2 sensors to determine a temperature thereof; wherein once the one or more O2 sensors have reached the predetermined target temperature and the engine is turned on, initiating, by the controller, a closed loop feedback fuel control; wherein the closed loop feedback fuel control is initiated as soon as the engine is turned on, without performing an open loop fuel control; wherein the closed loop feedback fuel control includes a targeted fuel-air ratio; wherein the at least one O2 sensor includes a heating element configured to heat the at least one O2 sensor; wherein the at least one O2 sensor includes a first O2 sensor and a second O2 sensor; and wherein the catalytic converter includes a first catalyst disposed upstream of a second catalyst, and wherein the first O2 sensor is disposed upstream of the first catalyst, and the second O2 sensor is disposed downstream of the first catalyst and upstream of the second catalyst.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As previously mentioned, some vehicle exhaust systems include a three-way catalytic converter (TWC) to convert exhaust gas constituents such as carbon monoxide (CO), carbon dioxide (CO2), oxygen (O2), hydrocarbons (HC), and nitrogen oxides (NOx) to reduce emissions. Every second the engine is running and the catalyst is not at or above light-off temperature, exhaust gas constituents such as CO, CO2, O2, HC, and NOx are not being converted efficiently. The short time preceding the catalyst light-off is responsible for a very large portion of the CO, HC, and NOx breakthrough for on and off cycle starts and long idles. Additionally, during cold start, fueling is in open loop operation as it takes some time for the oxygen (O2) sensor to heat up before it is ready for closed loop operation. During this time, large fueling inaccuracies can occur, increasing tailpipe emissions of the engine while fueling is in open loop control with no feedback.

Accordingly, the systems and methods described herein provide O2 sensor heater control for hybrid vehicles, which is configured to enable closed loop fueling operation for improved emissions during engine starts. The heater control logic enables the O2 sensor heaters once the vehicle propulsion system is Active to ensure closed loop operation is enabled and immediately available once the engine is cold started. This allows the use of a targeted fuel-air ratio to be used for closed loop fueling control, which reduces the dependency of the airflow model accuracy reducing variations in fueling and tailpipe emissions. As such, rather than requiring an open loop fuel control operation while the O2 sensors warm up, the system described herein activates the O2 sensor heaters as soon as the propulsion system is active such that the O2 sensors are ready for closed loop operation immediately upon engine start.

Figure 1:
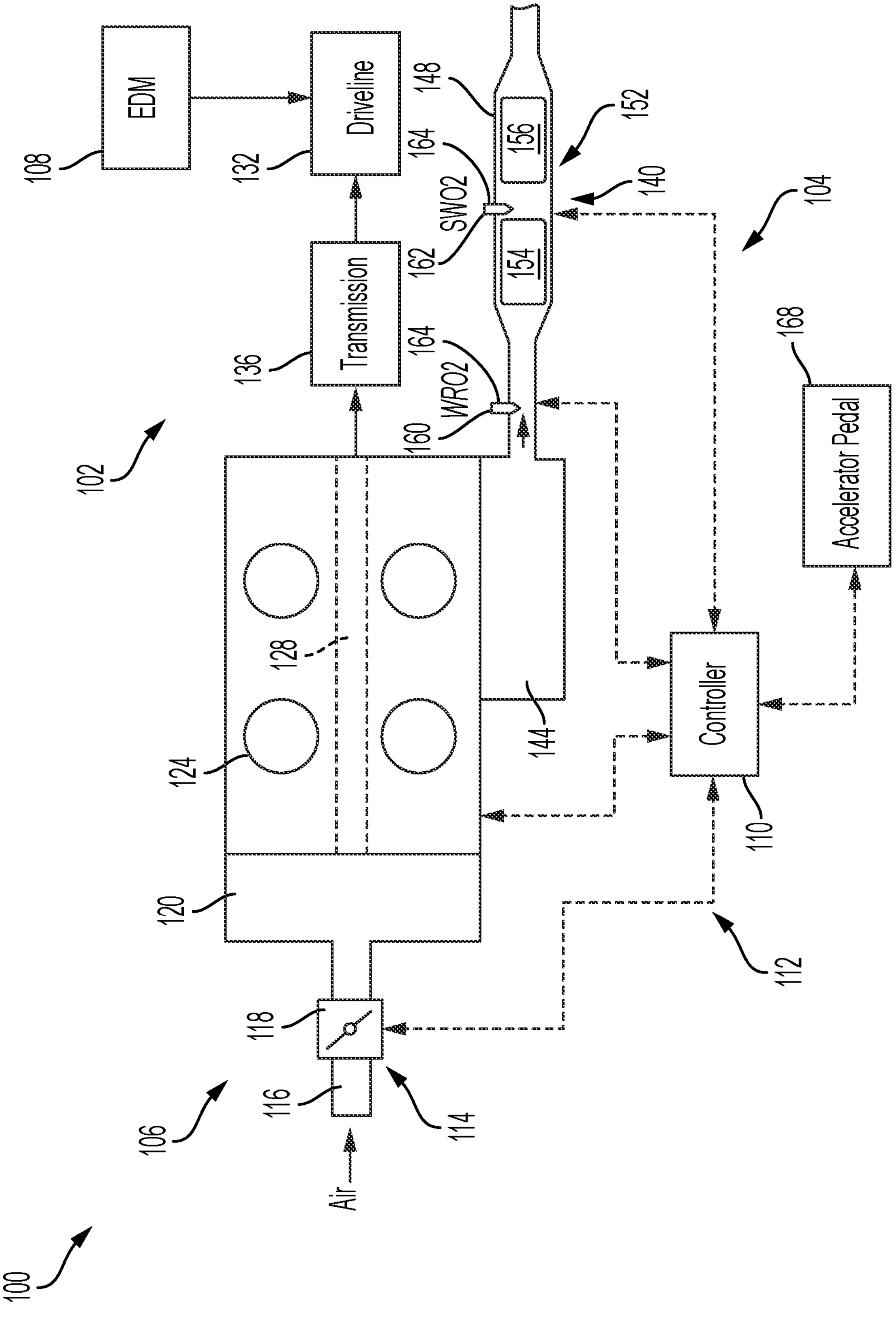
FIG. 1 is a schematic diagram of an example hybrid electric vehicle (HEV) having an internal engine and an exhaust system in accordance with the principles of the present application.

Referring now to FIG. 1, a schematic diagram of an example plug-in hybrid electric vehicle (PHEV) 100 is illustrated having a hybrid powertrain 102 and a powertrain control system 104 according to example implementations of the disclosure. In the illustrated example, the powertrain 102 generally includes an internal combustion engine 106 and one or more electric drive modules (EDM) 108 to provide drive torque to the PHEV 100. The hybrid powertrain 102 is controlled by the powertrain control system 104, which generally includes one or more controllers 110, such as a hybrid control processor (HCP) and/or engine control unit (ECU). The controller 110 is a central supervisory control configured to communicate with various components/modules of the hybrid powertrain 102 via a CAN bus 112. The EDM(s) 108, which include an electric traction motor, are powered by a high voltage battery (not shown) to selectively provide drive torque to the vehicle wheels.

The engine 106 draws air through an induction system 114 comprising an induction passage 116, a throttle valve 118, and an intake manifold 120. The air in the intake manifold 120 is dispersed to cylinders 124 and combined with fuel to form a fuel/air mixture that is combusted (e.g., by spark plugs) within cylinders 124 to drive pistons (not shown) that rotatably turn a crankshaft 128 generating drive torque. While four cylinders are shown, it will be appreciated that the engine 106 could include any suitable number of cylinders (six, eight, etc.).

The drive torque is transferred to a driveline 132 via a transmission 136. Additionally, torque generated by the engine 106 may be transferred to an electric motor or generator (not shown) instead of or in addition to the transmission 136. Exhaust gas resulting from combustion is expelled from the cylinders 124 into an exhaust system 140. The exhaust system 140 comprises an exhaust manifold 144, an exhaust passage 148, and a catalytic converter such as, for example, a three-way catalytic converter (TWC) 152 disposed along the exhaust passage 148 and configured to mitigate or eliminate CO, HC, and NOx in the exhaust gas.

In the example embodiment, the TWC 152 includes an upstream brick or catalyst 154 and a downstream brick or catalyst 156 for catalytic reactions. As previously discussed, the TWC 152 oxidizes the CO and HC (i.e., combines them with O2) to produce carbon dioxide (CO2) and water (H2O), and the TWC 152 reduces the NOx to nitrogen (N2) and O2. The exhaust system 140 further comprises an upstream exhaust gas O2 sensor 160 and a downstream exhaust gas O2 sensor 162. In the example embodiment, O2 sensor 160 is disposed upstream of the first catalyst 154, and the second O2 sensor 162 is disposed "mid-brick" between the first and second catalysts 154, 156. Alternatively, the second O2 sensor 162 may be disposed downstream of second catalyst 156. It will be appreciated that the techniques of the present disclosure could be achieved using only one of these sensors 160, 162 (e.g., to save costs). However, utilizing both of the sensors 160, 162 may increase the accuracy and/or robustness of the techniques.

In the example embodiment, each O2 sensor 160, 162 includes a heating element 164 (e.g., a resistor) configured to heat the O2 sensor 160, 162 during cold start or cold ambient conditions. The O2 sensor 160, 162 is heated to a predetermined target temperature (e.g., ~700° C.) in order to enable/provide proper sensor feedback to controller 110 for closed loop fueling control of engine 106. For example, the O2 sensor may be calibrated to be accurate within a tight temperature tolerance since temperature of the O2 sensor affects the concentration and diffusion rate of the oxygen within the sensing element. Accordingly, if the O2 sensor 160, 162 has not reached the predetermined target temperature, it may be inaccurate or unusable. In one example, controller 110 selectively provides power (e.g., 12V) to the heating element 164 for a duty cycle between 0% and 100% to maintain the O2 sensor 160, 162 at the predetermined target temperature for closed loop operation. In one example, such as during humid or cold conditions, the duty cycle of heating element 164 is lowered (e.g., 50%) to evaporate any condensate on the O2 sensor before operating at 100% duty cycle.

In the example implementation, the O2 sensors 160, 162 are linear-type O2 sensors, switching-type O2 sensors, or some combination thereof. Whereas a switching-type O2 sensor switches its output in response to rich and lean fuel/air (FA) ratio transitions, a linear-type O2 sensor could output a voltage indicative of the FA ratio and thus this voltage could be monitored to determine when it passes through a voltage level associated with stoichiometry. However, O2 sensors 160, 162 may be any suitable type of sensor that enables control system 104 to function as described herein.

In the example embodiment, the controller 110 controls operation of the engine 106, such as controlling airflow/fueling/spark to achieve a desired drive torque. This desired drive torque could be based, for example, on input provided by a driver of the vehicle 100 via an accelerator pedal 168. The controller 110 also implements at least a portion of the techniques of the present disclosure, which are described in greater detail below with respect to FIG. 2.

Figure 2:
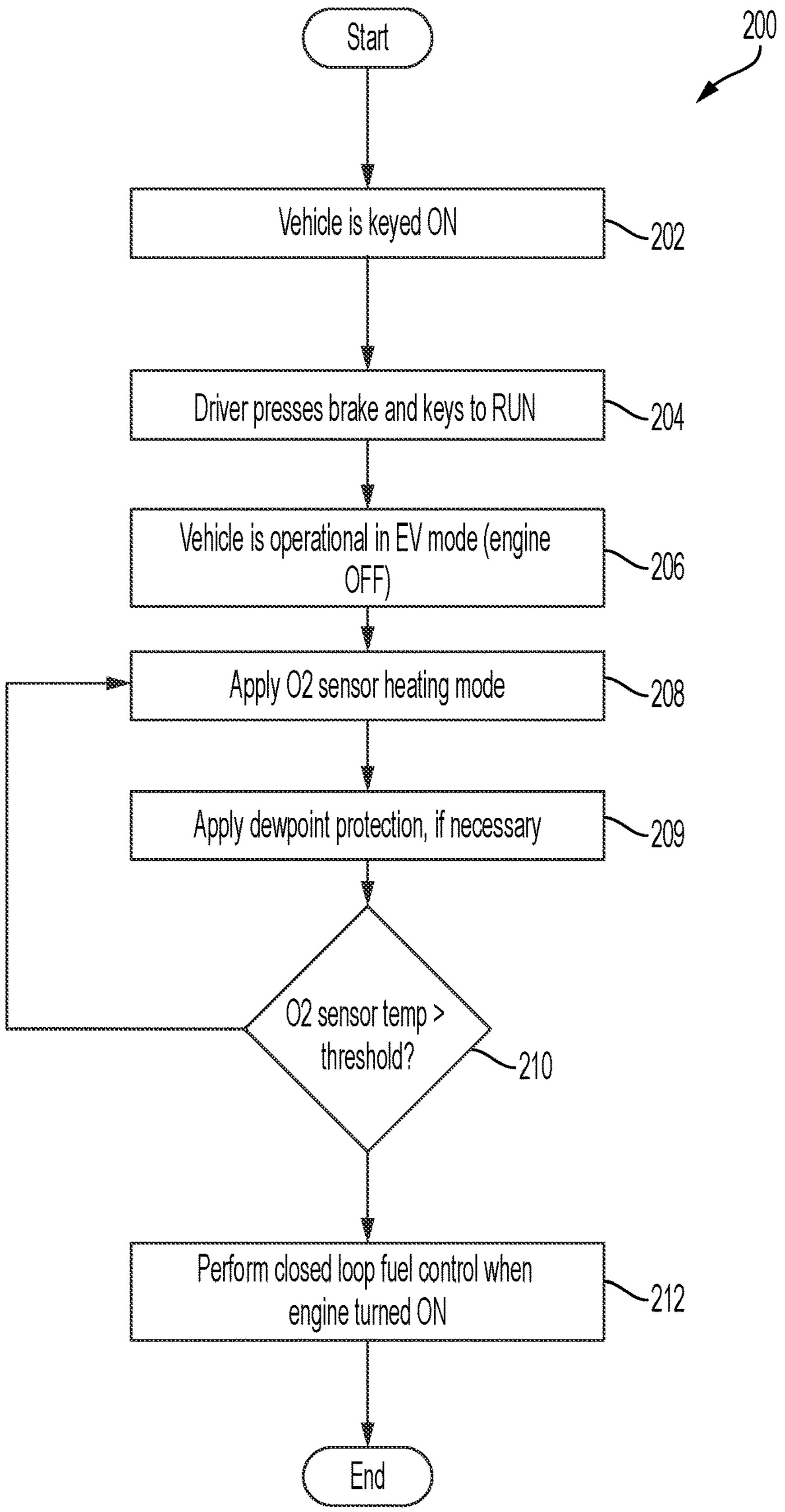
FIG. 2 is a flow diagram of an example method of controlling the HEV of FIG. 1 to reduce exhaust emissions during a cold start, in accordance with the principles of the present application.

Referring now to FIG. 2, a flow diagram of an example method 200 of controlling PHEV 100 to reduce exhaust emissions during a cold start is presented. At 202, controller 110 (e.g., control) determines the vehicle is keyed ON. At step 204, control determines the driver presses the brake pedal and keys the vehicle to RUN (e.g., presses 'start' button). At step 206, control initiates an EV mode where the EDM(s) 108 are configured to provide torque to the driveline 132. Notably, in the EV mode, the engine 106 is not turned ON. At step 208, control initiates an O2 sensor heating mode to operate heating element 164 to thereby heat O2 sensors 160, 162 to the predetermined target temperature for closed loop operation. At step 209, control performs a dewpoint protection, if necessary, to evaporate any water/condensation formed on the O2 sensors 160, 162. This is done by lowering the heating element duty cycle (e.g., to 50%) for a predetermined time period, for example, when vehicle sensors (not shown) indicate a particular temperature (e.g., below 50° F.), humidity, or other suitable condition indicating the presence of water/condensate.

At step 210, control monitors O2 sensors 160, 162 to determine if they have reached the predetermined target temperature such that they are ready for feedback control. For example, control monitors the resistance of O2 sensors 160, 162 to determine if the measured resistance exceeds a predetermined threshold or is within a predetermined range indicating the O2 sensor 160, 162 has reached the predetermined temperature for closed loop feedback control. If no, control returns to step 208. If yes, at step 212, once the engine 106 is turned on, control proceeds directly to closed loop feedback fuel control without having to heat the O2 sensors 160, 162 to the predetermined target temperature or perform an open loop fuel control. Control then ends and is repeated on a cold start.

Figure 3:
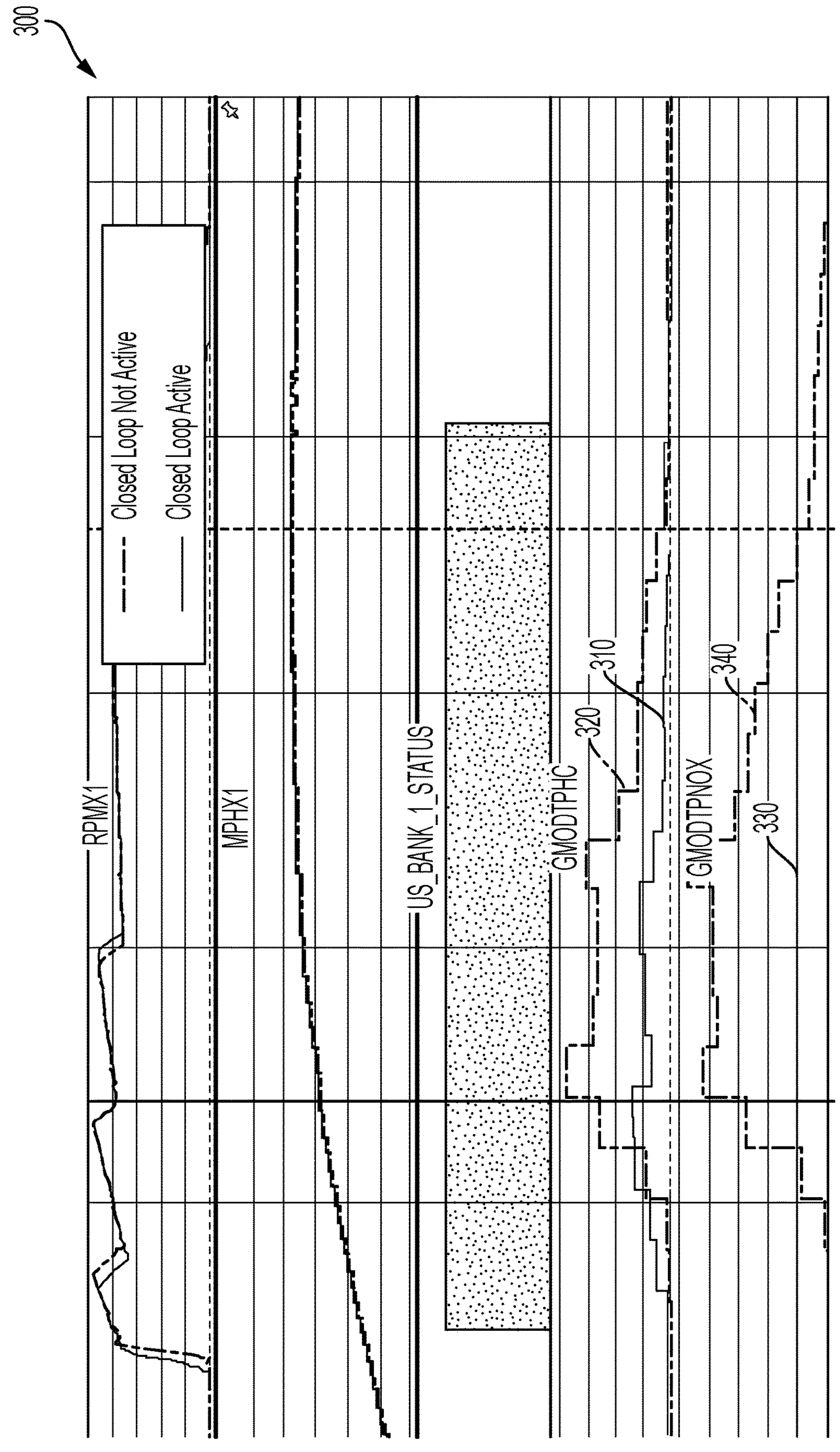
FIG. 3 illustrates an example plot of engine RPM and HC/NOx emissions with and without a closed loop fuel control, in accordance with the principles of the present application.

Accordingly, as shown in the example graph 300 of FIG. 3, the method 200 of controlling PHEV 100 during a cold start greatly reduces exhaust emissions. This is due to pre-heating the O2 sensors prior to engine-on, which enables the system to immediately operate in the closed loop fueling control, rather than first operating in a traditional open loop fuel control while the O2 sensors are heated to a temperature sufficient to provide feedback control. As shown, the method provides reduced HC emissions (line 310) with the closed loop operation compared to conventional HC emissions (line 320) when closed loop fuel control is not active because the O2 sensors 160, 162 have not reached the predetermined target temperature for closed loop feedback control. Similarly, the system provides reduced NOx emissions (line 330) with the closed loop operation compared to conventional NOx emissions (line 340) when closed loop fuel control is not active because the O2 sensors 160, 162 have not reached the predetermined temperature for closed loop feedback control.

Described herein are systems and methods for reducing exhaust emissions during a cold start of a hybrid electric vehicle. When the vehicle is started and the propulsion system is active for EV mode driving (engine OFF), the system immediately enables the O2 sensor heating. This in turn enables the system to immediately begin closed loop fueling control with a targeted fuel-air ratio when the engine is turned on, which obviates the need for open loop fueling control and dependency on airflow model accuracy. As a result, fuel variations are reduced, thereby leading to reduced tailpipe emissions (e.g., HC, NOx).

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A control system for a hybrid electric vehicle having an electric traction motor and an internal combustion engine with an exhaust system, the control system comprising:

one or more oxygen (O2) sensors disposed proximate to a catalytic converter in the exhaust system, the one or more O2 sensors each including a heating element to heat the O2 sensor and being configured to measure an O2 level of exhaust gas produced by the engine; and a controller in signal communication with the one or more O2 sensors and programmed to:

detect the hybrid electric vehicle is keyed on;

determine the hybrid electric vehicle is keyed to run in an electric vehicle (EV) mode without the engine started;

monitor one or more vehicle sensors to determine if a condition exists indicating a presence of condensate on the one or more O2 sensors; and initiate an O2 sensor heating mode to heat the one or more O2 sensors to a predetermined target temperature prior to the engine starting, wherein if the condition exists indicating the presence of condensate, the controller operates the heating element with a 50% reduced duty cycle to evaporate the condensate, wherein if the presence of condensate is not detected, the controller operates the heating element with a 100% duty cycle, and wherein the predetermined target temperature is operable for closed loop fueling feedback control, to thereby reduce exhaust emissions.

2. The control system of claim 1, wherein the controller is further programmed to monitor the one or more O2 sensors to determine they have reached the predetermined target temperature such that they are ready for closed loop fueling feedback control.

3. The control system of claim 2, wherein the controller monitors a resistance of the one or more O2 sensors to determine a temperature thereof.

4. The control system of claim 2, wherein once the one or more O2 sensors have reached the predetermined target temperature and the engine is turned on, the controller is further programmed to initiate the closed loop feedback fuel control.

5. The control system of claim 4, wherein the controller is programmed to initiate the closed loop feedback fuel control as soon as the engine is turned on, without performing an open loop fuel control.

6. The control system of 4, wherein the closed loop feedback fuel control includes a targeted fuel-air ratio.

7. The control system of claim 1, wherein the one or more O2 sensors include a first O2 sensor and a second O2 sensor.

8. The control system of claim 7, wherein the catalytic converter includes a first catalyst disposed upstream of a second catalyst, and wherein the first O2 sensor is disposed upstream of the first catalyst, and the second O2 sensor is disposed downstream of the first catalyst and upstream of the second catalyst.

9. A method of reducing exhaust emissions during a cold start of a hybrid electric vehicle having an electric traction motor and an internal combustion engine with an exhaust system, the method comprising:

providing a controller in signal communication with one or more oxygen (O2) sensors disposed proximate to a catalytic converter in the exhaust system, the one or more O2 sensors each including a heating element to heat the O2 sensor and being configured to measure an O2 level of exhaust gas produced by the engine;

detecting, by the controller, the hybrid electric vehicle is keyed on;

determining, by the controller, the hybrid electric vehicle is keyed on to run in an electric vehicle (EV) mode without the engine started;

monitoring one or more vehicle sensors to determine if a condition exists indicating a presence of condensate on the one or more O2 sensors; and initiating, by the controller, an O2 sensor heating mode to heat the one or more O2 sensors to a predetermined target temperature prior to the engine starting, operating, by the controller, the heating element with a 50% reduced duty cycle to evaporate the condensate, if the condition exists indicating the presence of condensate, wherein if the presence of condensate is not detected, the controller operates the heating element with a 100% duty cycle, and wherein the predetermined target temperature is operable for closed loop fueling feedback control, to thereby reduce exhaust emissions.

10. The method of claim 9, further comprising monitoring the one or more O2 sensors to determine they have reached the predetermined target temperature such that they are ready for closed loop fueling feedback control.

11. The method of claim 10, wherein the controller monitors a resistance of the one or more O2 sensors to determine a temperature thereof.

12. The method of claim 10, further comprising:

wherein once the one or more O2 sensors have reached the predetermined target temperature and the engine is turned on, initiating, by the controller, a closed loop feedback fuel control.

13. The method of claim 12, wherein the closed loop feedback fuel control is initiated as soon as the engine is turned on, without performing an open loop fuel control.

14. The method of claim 12, wherein the closed loop feedback fuel control includes a targeted fuel-air ratio.

15. The method of claim 9, wherein the one or more O2 sensors include a first O2 sensor and a second O2 sensor.

16. The method of claim 15, wherein the catalytic converter includes a first catalyst disposed upstream of a second catalyst, and wherein the first O2 sensor is disposed upstream of the first catalyst, and the second O2 sensor is disposed downstream of the first catalyst and upstream of the second catalyst.

* * * * *